(12) United States Patent
Esnal Olasagasti et al.

(10) Patent No.: US 12,324,512 B2
(45) Date of Patent: Jun. 10, 2025

(54) STRUCTURE FOR DETERMINING SHELVES AND ITEMS OF FURNITURE

(71) Applicant: DHEMEN DESIGN S.L., Gipuzkoa (ES)

(72) Inventors: Igor Esnal Olasagasti, Orio (ES); Millan Elduayen Urcola, Alcorcon (ES)

(73) Assignee: DHEMEN DESIGN S.L., Gipuzkoa (ES)

( * ) Notice: Subject to any disclaimer, the term of this patent is extended or adjusted under 35 U.S.C. 154(b) by 0 days.

(21) Appl. No.: 18/567,279

(22) PCT Filed: Jun. 11, 2021

(86) PCT No.: PCT/ES2021/070430
§ 371 (c)(1),
(2) Date: Jan. 3, 2024

(87) PCT Pub. No.: WO2022/258856
PCT Pub. Date: Dec. 15, 2022

(65) Prior Publication Data
US 2024/0260750 A1    Aug. 8, 2024

(51) Int. Cl.
*A47B 87/00* (2006.01)
*F16B 7/18* (2006.01)
*F16B 12/40* (2006.01)

(52) U.S. Cl.
CPC .......... *A47B 87/001* (2013.01); *A47B 87/005* (2013.01); *F16B 7/185* (2013.01); *F16B 12/40* (2013.01)

(58) Field of Classification Search
CPC . A47B 87/001; A47B 87/005; A47B 87/0223; A47B 47/0008; F16B 12/40;
(Continued)

(56) References Cited

U.S. PATENT DOCUMENTS 3,532,369 A * 10/1970 Reilly ........................ E04G 7/22
403/178
3,645,569 A * 2/1972 Reilly .................. F16B 7/0446
403/217
(Continued)

FOREIGN PATENT DOCUMENTS

GB      1088133 A      10/1967

OTHER PUBLICATIONS

International Search Report for corresponding International Application No. PCT/ES2021/070430 dated Feb. 22, 2022, and English Translation.

*Primary Examiner* — Ko H Chan
(74) *Attorney, Agent, or Firm* — LUCAS & MERCANTI, LLP (57) ABSTRACT

A structure for determining shelves and items of furniture, formed by nodes (1) and tubular profiles (2). Each node (1) has at least two arms (1.2) fitted and fastened inside the ends of each section of tubular profile (2), which is a single-body piece along the entire inside of an internal shape (2.1) with a square external edge. Each arm (1.2) of the node (1) has a part (1.2.1) corresponding to the internal square shape (2.1) with a square polygonal edge, the corners have bevels along the length with screw threads (1.2.2) extending parallel to the longitudinal axis of each arm, such that by inserting each arm (1.2) into a tubular profile (2) and rotating relative to one another, the crests of the screw threads (1.2.2) engage against the internal faces of walls (2.2) of the internal square shape (2.1), fastening each node (1) to a respective tubular profile (2).

7 Claims, 12 Drawing Sheets

(58) Field of Classification Search
CPC .. F16B 12/50; F16B 2/10; F16B 7/185; A47F 5/10
See application file for complete search history.

(56) References Cited

U.S. PATENT DOCUMENTS

| | | | | |
|---|---|---|---|---|
| 3,864,051 | A * | 2/1975 | Reid | F16B 7/0446 |
| | | | | 411/180 |
| 4,111,577 | A | 9/1978 | Kiyosawa | |
| 4,161,375 | A | 7/1979 | Murphy | |
| 4,610,561 | A * | 9/1986 | Cecchellero | F16B 7/185 |
| | | | | 403/171 |
| 4,768,845 | A * | 9/1988 | Yeh | A47B 47/0008 |
| | | | | 312/263 |
| 4,770,560 | A * | 9/1988 | Ott | F16B 37/005 |
| | | | | 403/348 |
| 8,678,616 | B2 * | 3/2014 | Marquardt | F21V 29/70 |
| | | | | 362/238 |
| 10,164,388 | B2 * | 12/2018 | Kokenda | H02G 5/002 |
| 2006/0209537 | A1 * | 9/2006 | Stelmasik | A47F 11/10 |
| | | | | 362/217.16 |
| 2011/0095527 | A1 | 4/2011 | Miyoshi | |
| 2015/0377414 | A1 * | 12/2015 | Pirseyedi | F16B 7/0466 |
| | | | | 403/205 |
| 2019/0191872 | A1 * | 6/2019 | Dreher | E04B 2/7437 |

* cited by examiner

STRUCTURE FOR DETERMINING SHELVES AND ITEMS OF FURNITURE

CROSS-REFERENCE TO RELATED APPLICATIONS

This application is a 371 of PCT/ES2021/070430, filed Jun. 11, 2021, which is incorporated herein by reference.

TECHNICAL FIELD

The present invention relates to rectangular or prismatic structures that are used for determining shelves and items of furniture and that are made up of a set of connecting parts, to which profiles that define the longitudinal beams and transverse beams of the structure are attached.

STATE OF THE ART

Currently known are structures formed by a series of longitudinal beams and transverse beams made up of tubular profiles which ends are attached to parts called nodes, in order to form a quadrangular frame-like structure or a prismatic, normally rectangular, structure formed by one or more modules and used for determining items such as: shelving; shelves; items of furniture; displays for the sale of products in the retail sector; structures in a stand at a fair or exhibition hall, etc.

In determining these structures, the key part is the joint between the tubular profiles and their corresponding end nodes, which can be simple brackets or parts formed by a core from which arms that are inserted into the tubular profiles protrude.

In the case of internal brackets, the tubular profiles must normally be mitre-cut and the joining area of two profiles does not have an adequate finish. In the case of using the so-called nodes, solutions that use screws that thread into the arms of the nodes or solutions that use analogous securing means are already known. All of these solutions have the same problem, which is the need to use tools to assemble the structure and a defective finish in the area of the nodes, where the heads of the securing elements are visible, something which is unsightly.

A solution is also known in which the ends of the tubular profiles have an insert at their ends with an internal screw thread to be joined by threading to the arms of the nodes, which in turn are threaded. This solution involves having to manufacture the inserts independently of the tubular profiles and then insert them into the ends of the profile and fasten them to the same, which entails a complex process. Furthermore, and although this solution does not require tools to assemble the structure, it implies the need to spend considerable time on threading between the tubular profiles and the nodes, which is a negative aspect, for example, when assembling stands and structures for retail, which must be carried out as quickly as possible.

U.S. Pat. No. 3,532,369, applied for in 1968, already discloses a structure for forming frames with tubular profiles, into which the protruding arms of nodes located in the corners are inserted, these arms having external longitudinal projections that rub along the internal faces of the tubular profile, giving rise to a press-fit due to interference. This solution does not offer a sufficiently robust and secure fastening.

U.S. Pat. No. 3,645,569, applied for in 1970, discloses a solution to establish a joint between a hollow rectangular tubular profile and a node that has at least two protruding arms with a rectangular cross section. At each of its ends, each tubular profile incorporates an insert intended to fit the corresponding arm of the node into the same. The joint is established by inserting the arm into the insert and then rotating the tubular profile one-eighth of a turn to bring the corners of the arm into an interference fit with locking portions of the insert. This solution implies having to manufacture the inserts independently of the tubular profiles and then insert them into the ends of the profile and fasten them to the same, which entails a complex process that makes the final result more expensive and also requires each tubular profile to already leave the factory with specific measurements since the inserts have to be fastened at their ends.

U.S. Pat. No. 4,111,577, applied for in 1977, also discloses a solution for joining a node to tubular profiles, wherein the node has arms intended to fit inside the tubular profile, each arm having a conical shape towards its free end, with a cruciform cross section; so that the upper portion of each branch of the cross press-fits inside the tubular profile. This solution does not offer a joint with sufficient robustness and guarantee.

U.S. Pat. No. 4,770,560, applied for in 1987, discloses a connector node for cross-sectionally square, rectangular, hexagonal or other shaped tubular profiles, which includes a solid cube-shaped block body having tapered arm members extending outwards; each arm having a spiral tube thread around it intercepted by elongated slots so that the arm is cross-sectionally Greek cross-shaped with four ribs that have on their outside outward portions of the screw thread between the slots, so that each arm can be inserted into one end of the tubular profile in a radial position, with the thread portions coinciding with the corners of the tubular profile; so that the subsequent rotation of the tubular profile causes the thread on the outside of the ribs to engage in the internal walls of the tubular profile. This solution has two fundamental problems:

Since the arms had a tapered conical shape, the screw threads of the cross-shaped ribs and the internal faces of the tubular profile only made contact at essentially only one screw thread, which did not allow for secure fastening.

Since the screw threads engage against the internal face of the tubular profile, they acted as a die against those faces. This made it necessary to make the tubular profile have sufficient thickness so that it would not outwardly show the consequences of this die action, which complicated and made the embodiment of this tubular profile more expensive.

To try to solve this problem, the option of including inserts at the ends of the tubular profile is disclosed in the same Patent; however, then the problem indicated in U.S. Pat. No. 3,645,569 occurs.

In view of the described disadvantages and limitations exhibited by the solutions that have existed until now, it is necessary to have a solution that overcomes these drawbacks and that is the object of the present invention.

OBJECT OF THE INVENTION

In order to fulfil this objective and solve the technical problems discussed so far, in addition to providing additional advantages that are mentioned later, the present invention provides a solution for determining structures of this type that consists of the following: Each element called an arm that protrudes from the core of a node has an area that ends at the free end of said arm and has a cross section with a polygonal, preferably square, edge. With regard to each of the corners of this area with a square edge, there is a bevel with a screw thread; so that four external bevelled sections are determined along the arm and are paraxial to the longitudinal axis of said arm and, preferably, a screw thread is determined in all of these external bevelled sections.

With regard to the tubular profiles, each profile determines an internal polygonal shape therein, said shape preferably being square with four walls corresponding to the shape that defines the cross section of the arm of the node. Thus, taking advantage of the fact that the distance in the internal diagonals of this internal substantially square shape is greater than the distance between two of its opposite faces, this allows the corresponding arm of a node to be inserted so that its external threaded sections enter a position close to the ends of the diagonals of the internal quadrangular shape of the tubular profile, and with a simple turn, preferably no more than 45°, these external threaded sections engage inside the faces of the walls of the internal square shape, thereby firmly fastening the node to the tubular profile, without needing to use any tool and with a simple and quick turn of no more than 45°.

Furthermore, it has been envisaged that said internal square shape of the tubular profiles has, at least in one of its walls, at least one opening to set a final fastening point between each node and its corresponding tubular profile. In addition, this opening also allows other functions to be fulfilled, such as the passage of electrical cables, when the tubular profile incorporates its own lighting means.

To incorporate these lighting means, which will preferably be one or more LED light strips, each tubular profile has an external quadrangular shape and, in relation to at least one of its corners, it has an opening that allows a decorative closing weatherstrip to be incorporated by means of simple elastic clipping and, behind it, if the tubular profile is to incorporate its own lighting, it has the corresponding one or more LED light strips.

To assemble this structure and specifically to join each tubular profile to a node, it is enough to insert the corresponding arm of said node into the tubular profile, in the radial position that allows the free entry of said arm, taking advantage of the greatest distance that exists in the diagonals of the internal square shape of the tubular profile and, once inserted, rotating the node and the tubular profile relative to one another by no more than 45°, so that the external threaded sections of each arm engage inside of the faces of the internal square shape of the tubular profile, so that the node and the tubular profile become fastened, without needing to use any tool.

There are also some concepts to highlight in this solution:

The first is that the internal square shape of the tubular profiles extends along the entire length of each tubular profile, since this profile is obtained through an extrusion process, such that the complexity of having to insert and fasten inserts at the ends of the tubular profile is avoided.

Since the internal square shape of the tubular profiles extends along the entire length of each tubular profile, these profiles can be manufactured to have long measurements and the end user can shape the structure with the dimensions required in each case by simply cutting the needed measurement of the longitudinal beams and transverse beams defined by the tubular profiles. This is possible since when any piece of tubular profile is cut, its ends already have the internal square shape in which the screw threads of the arms of the node engage.

The internal square shape of each tubular profile, in which faces the external threaded sections of each arm of a node engage, can have the most suitable section in each case in order to achieve firm fastening and the outside of the tubular profile does not show deformations or the effects of said engagement.

Fastening of the external threaded sections of each arm to the walls of the internal square shape of each longitudinal profile occurs by interference along the entire length of the external threaded sections of each arm and the corresponding wall of the internal square shape of each longitudinal profile. Since there is no specific interference on one thread of the screw, but rather on all the threads of the screw along the entire section with the screw thread, fastening is firmer and more secure.

This solution provides great flexibility, since it allows this system to be adapted to various dimensions/external designs of the tubular profiles and to also be complemented, for example, with rails for sliding doors or hanging accessories that are incorporated into the housing space of the tubular profile for LED light strips.

DETAILED DESCRIPTION OF THE INVENTION

Figure 1:
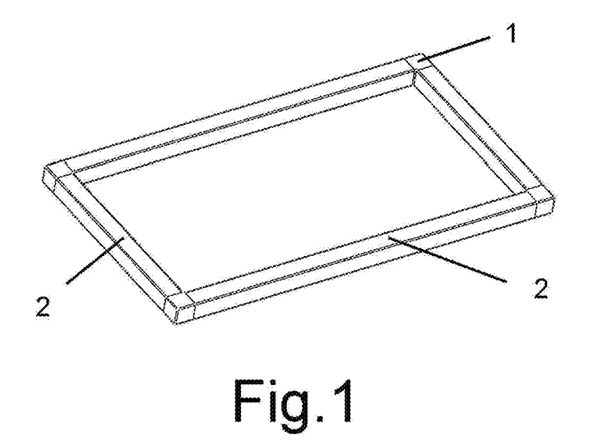
FIG. 1 shows a schematic perspective view of a frame made up of nodes (1) and tubular profiles (2) that determine the corresponding longitudinal beams and transverse beams of the structure.
Figure 2:
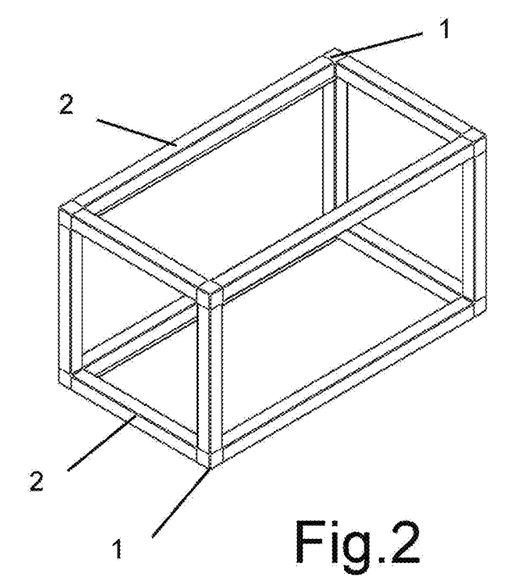
FIG. 2 shows a schematic perspective view of a rectangular prismatic structure also made with the nodes (1) and the tubular profiles (2) that defines a simple cube.
Figure 3:
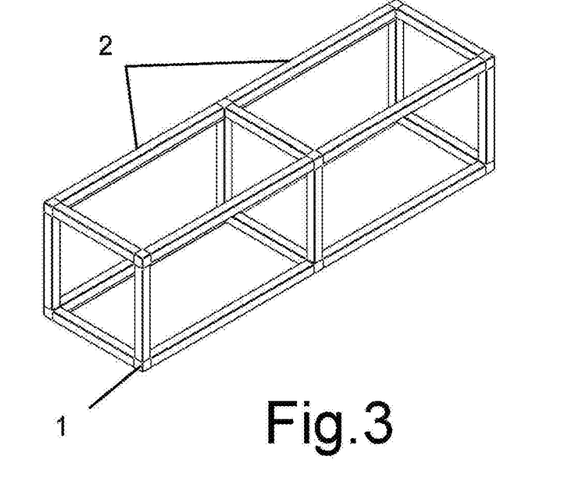
FIGS. 3 and 4 are views like those of FIG. 2, but now forming compound cubes.
Figure 4:
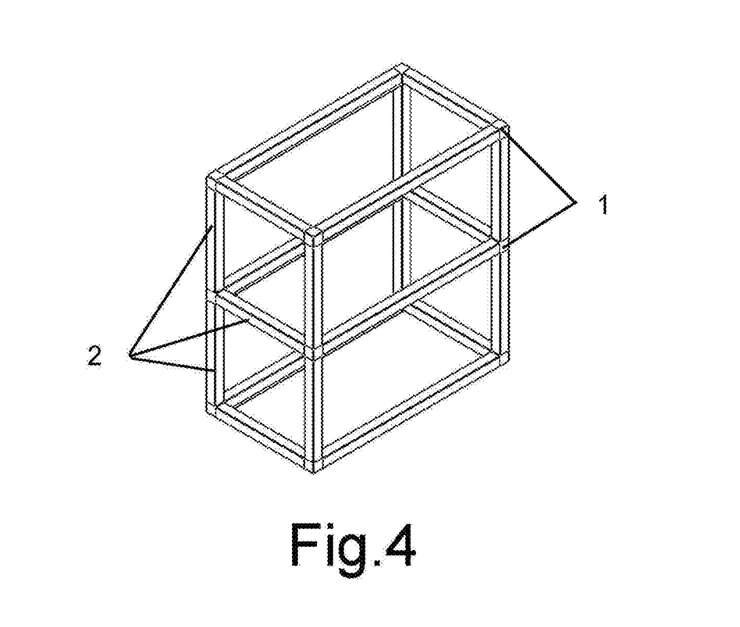
Figure 5:
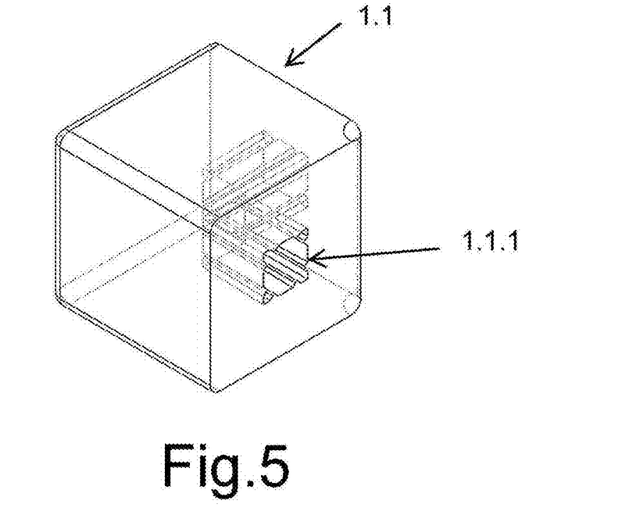
FIG. 5 is a perspective view showing the core (1.1) of a node (1), with two housings (1.1.1) and made according to a non-limiting example of a practical embodiment.
Figure 6:
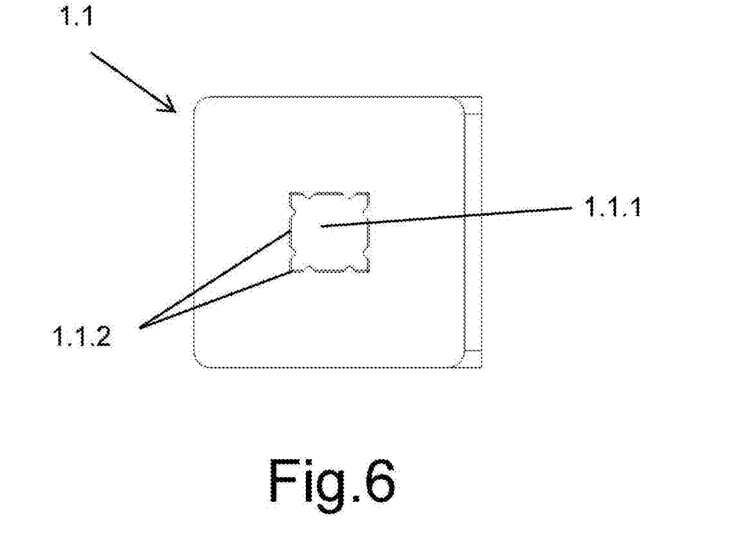
FIG. 6 is an elevation view of the core (1.1) of FIG. 5, showing the housings (1.1.1).
Figure 7:
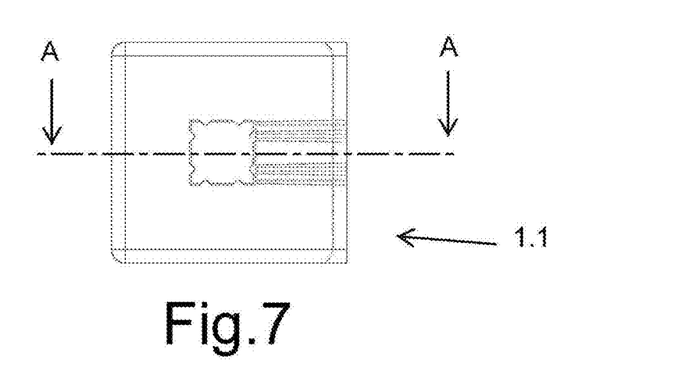
FIG. 7 is the profile view of FIG. 6.
Figure 8:
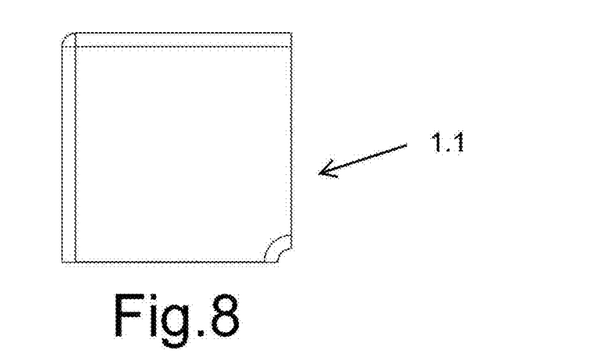
FIG. 8 shows the upper plan view of FIG. 7.
Figure 9:
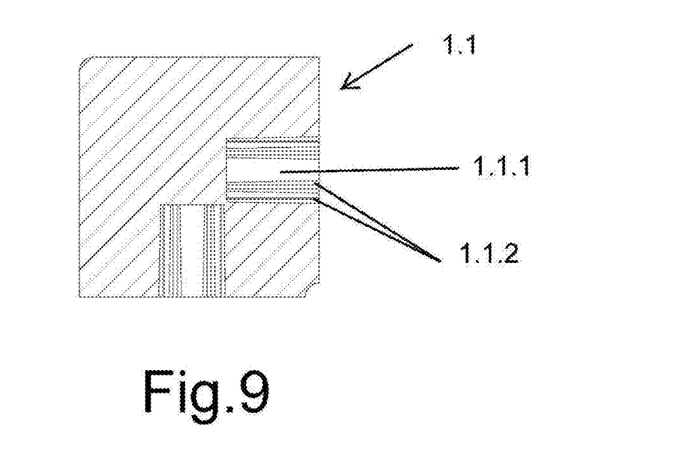
FIG. 9 shows the section A-A indicated in FIG. 7.
Figure 10:
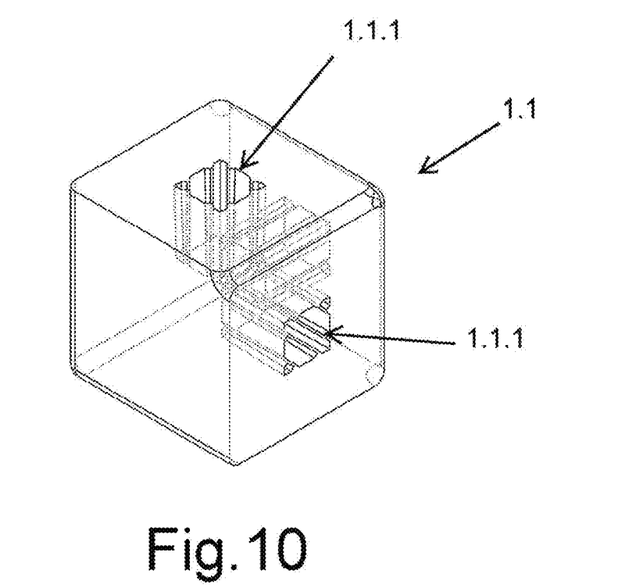
FIGS. 10 and 11 are two views like that of FIG. 5, but with three and four housings (1.1.1), respectively.
Figure 11:
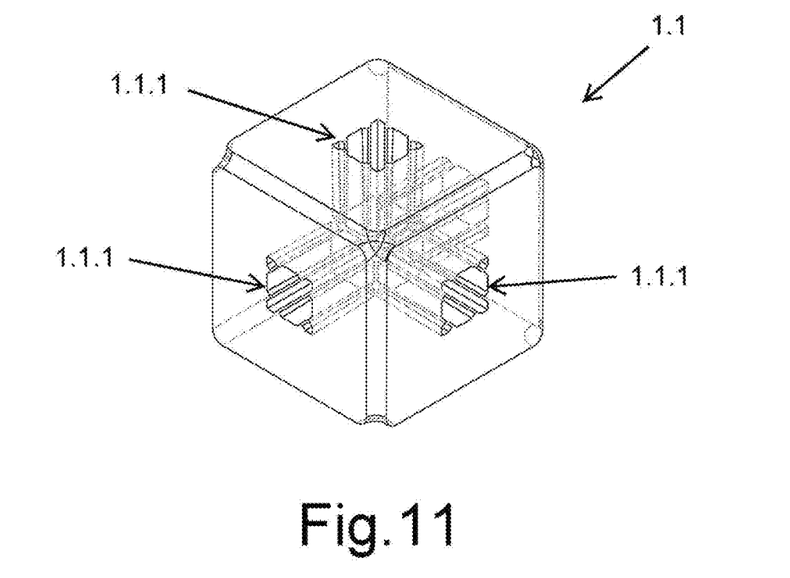
Figure 12:
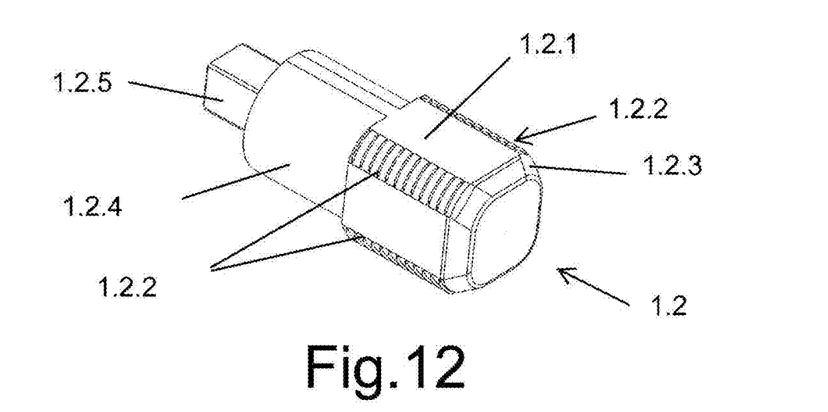
FIG. 12 is a perspective view of an arm (1.2) of a node (1).
Figure 13:
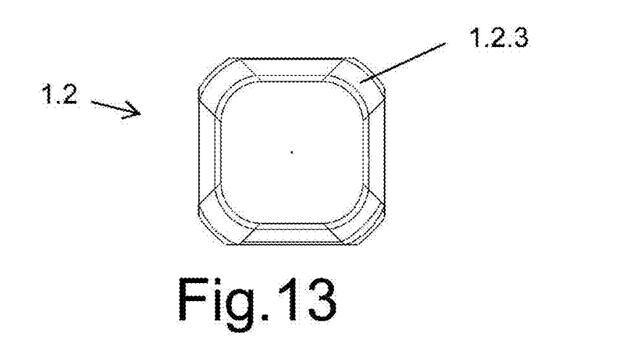
FIG. 13 is the right profile view of FIG. 14.

The present invention relates to a structure for constructing shelving, shelves and items of furniture that is made up of a series of nodes (1), to which tubular profiles (2) are fastened in order to shape, from a simple quadrangular frame having ninety degree angles, such as the one shown in FIG. 1, a prismatic structure with a preferably square or rectangular base, such as the one shown in FIG. 2, or even a structure made up of several prisms, such as those shown in FIGS. 3 and 4.

Each node (1), as shown in FIGS. 5 to 9, is made up of a core (1.1), preferably made of zamak, but which can also be made of other metals or other metal alloys, or synthetic materials, including composites or other materials or combinations of parts of different materials.

Each core (1.1) has at least two housings (1.1.1) that have toothing (1.1.2) for fastening, in each of these housings (1.1.1), an arm (1.2) preferably determined in a piece of steel obtained by bar turning, but which could be made of other materials or combinations of materials that allow the functions of said arm (1.2) to be fulfilled without thereby altering the object of the invention.

As shown in FIGS. 12 to 16, each arm (1.2) determines a first part (1.2.5) intended to be inserted into the corresponding housing (1.1.1) of the core (1.1), so that the interference between this part (1.2.5) and the toothing (1.1.2) of the core (1.1) securely fasten each arm (1.2) to its core (1.1).

Obviously, each arm (1.2) can be fastened to its core (1.1) using any other known solution without altering the object of the present invention, or even the arms (1.2) and their core (1.1) could be a single-body piece obtained, for example, by sintering given the complexity of their shapes.

Figure 14:
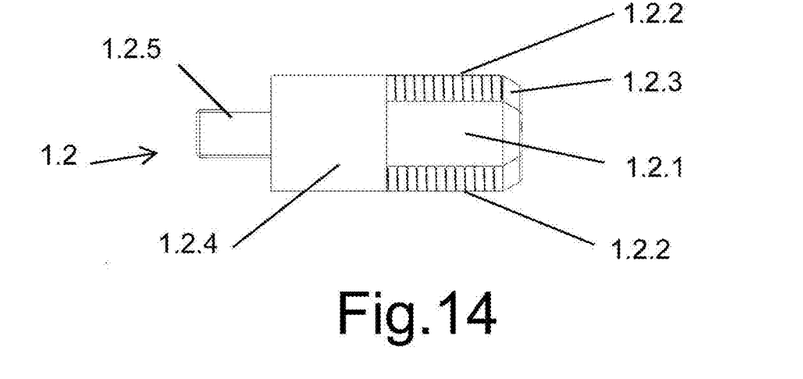
FIG. 14 shows the elevation view of the arm (1.2).
Figure 15:
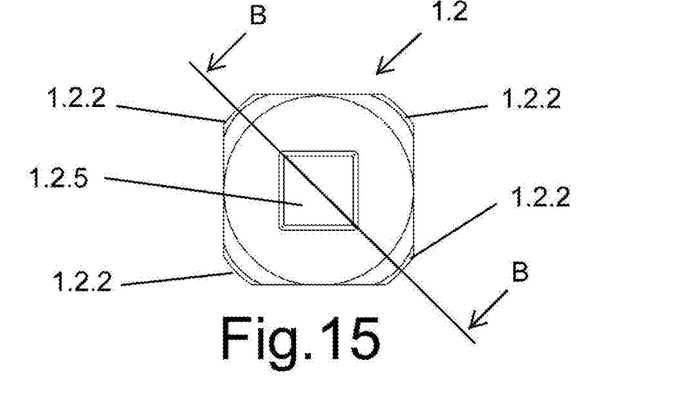
FIG. 15 is the left profile view of FIG. 14.
Figure 16:
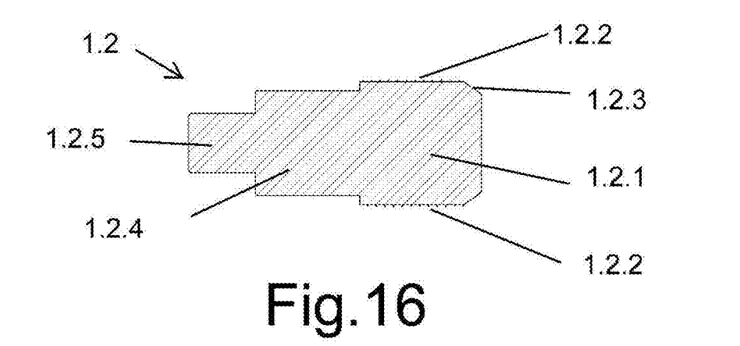
FIG. 16 shows the section B-B indicated in FIG. 15.

Each arm (1.2) also determines a central part identified with reference number (1.2.4) in FIG. 14 and adjacent to it, a part (1.2.1) that together with the central part (1.2.4) is projected as a cantilever from the core (1.1). This end part (1.2.1) has a polygonal cross section, preferably with a square edge, and having bevels along its corners, these bevels being paraxial to the longitudinal axis of said arm (1.2) and in which at least a part of them has a screw thread (1.2.2), such that the four screw threads (1.2.2) are parallel to one other and paraxial to the longitudinal axis of each arm (1.2).

Bevels (1.2.3) are determined at the free end of each arm (1.2) to open and facilitate the entry of each arm (1.2) into its respective tubular profile (2). These bevels (1.2.3) can also be determined, according to a variant of a practical embodiment, in an insert made up of a plastic finish that is assembled at the end of the arm (1.2).

Figure 17:
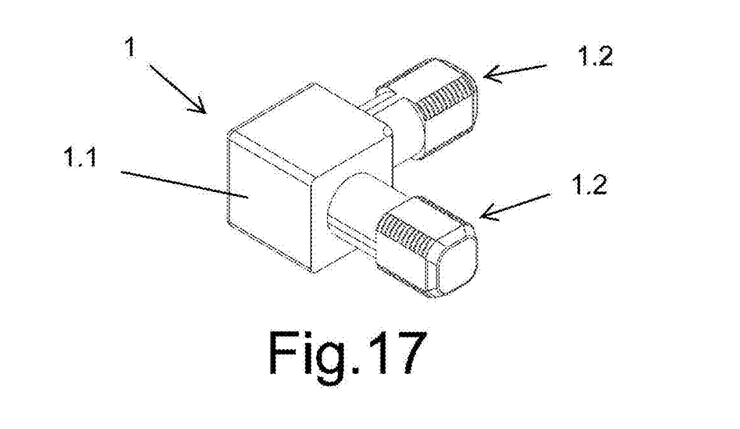
FIG. 17 is a perspective and schematic view showing a node (1) with two arms (1.2) and according to a non-limiting example of a practical embodiment.
Figure 18:
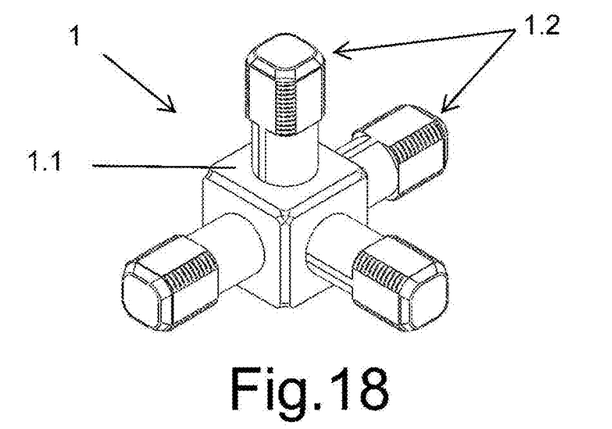
FIG. 18 is a view like that of FIG. 17, but now with a node (1) with four arms (1.2).

FIG. 17 shows a node (1) with two arms (1.2). The number of arms (1.2) will preferably be two, three, four or five units. FIG. 18 shows a node (1) with four arms (1.2).

The case could occur where there were more than five arms (1.2), providing the core (1.1) with a prismatic shape having polygonal bases with more than four sides, or even where the core (1.1) was a polyhedron, so that the structure formed between the nodes (1) and the tubular profiles (2) is in turn a polyhedral structure.

Figure 19:
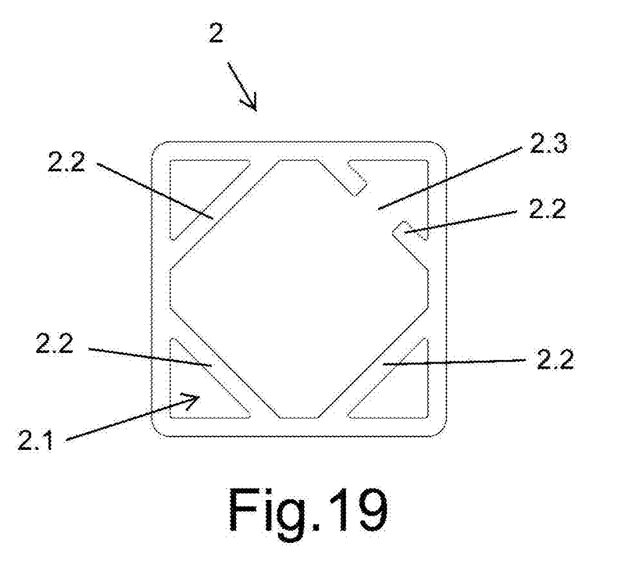
FIG. 19 is a front view of a tubular profile (2), according to a non-limiting example of a practical embodiment.
Figure 21:
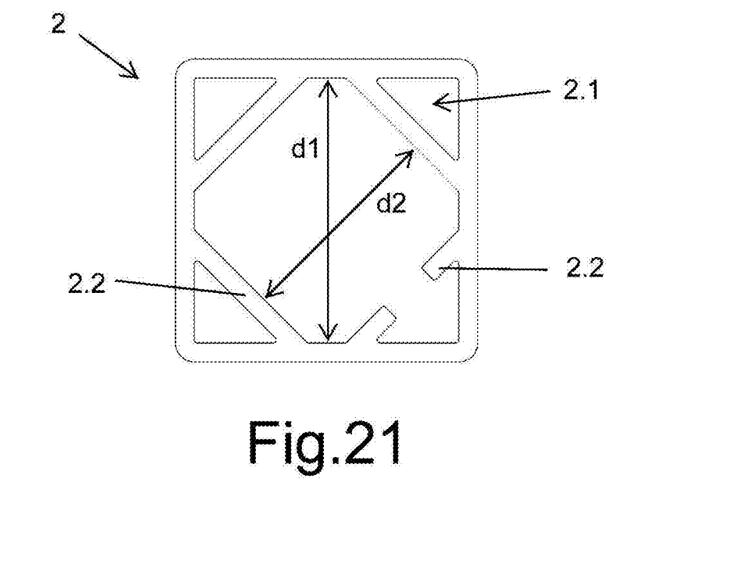
FIG. 21 is a view like that of FIG. 19, but indicating the difference in measurements between "d1" and "d2".
Figure 22:
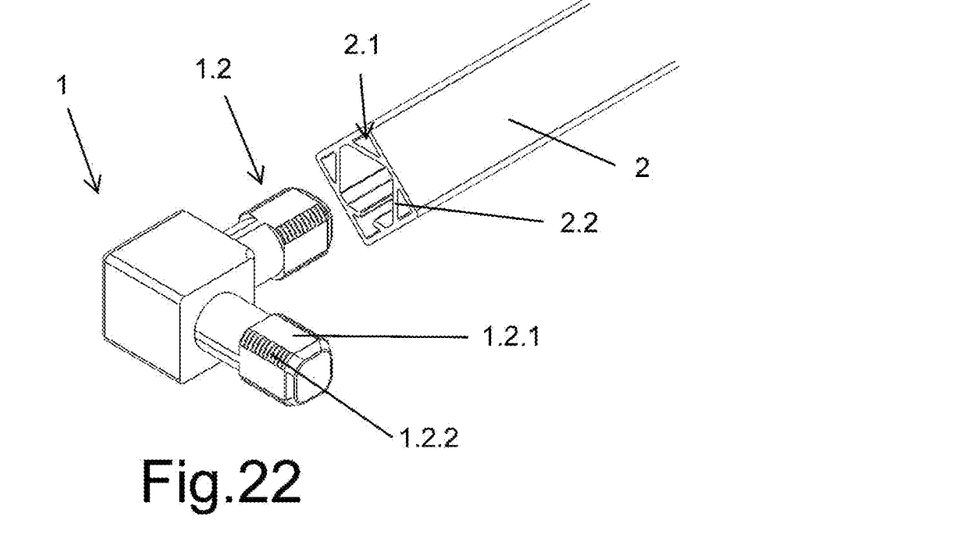
FIGS. 22, 23, 24 and 25 are perspective views that schematically show how a node (1) and a tubular profile (2) are fastened.
Figure 23:
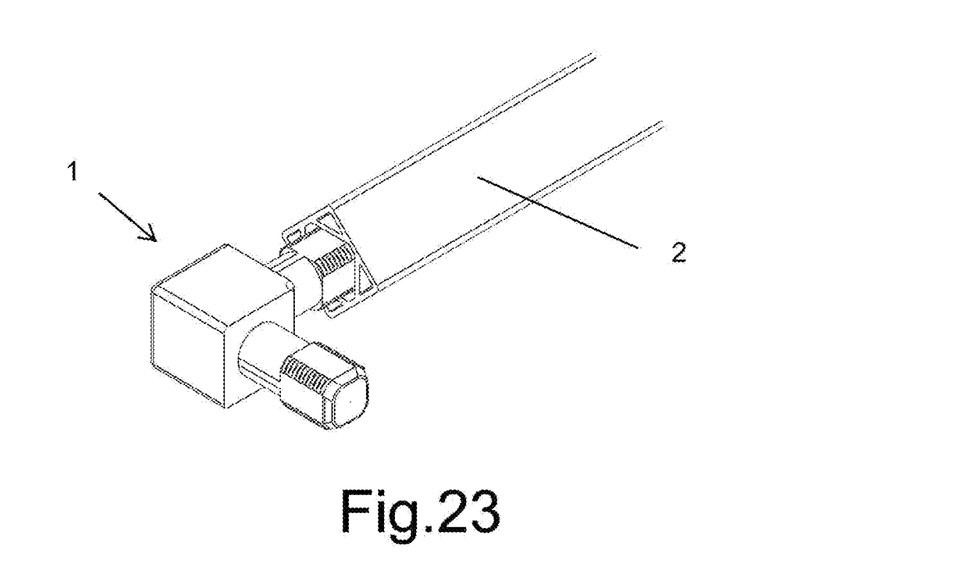
Figure 24:
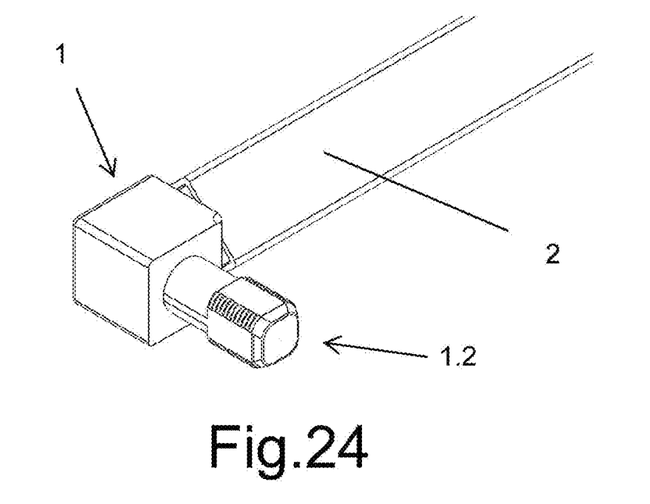
Figure 25:
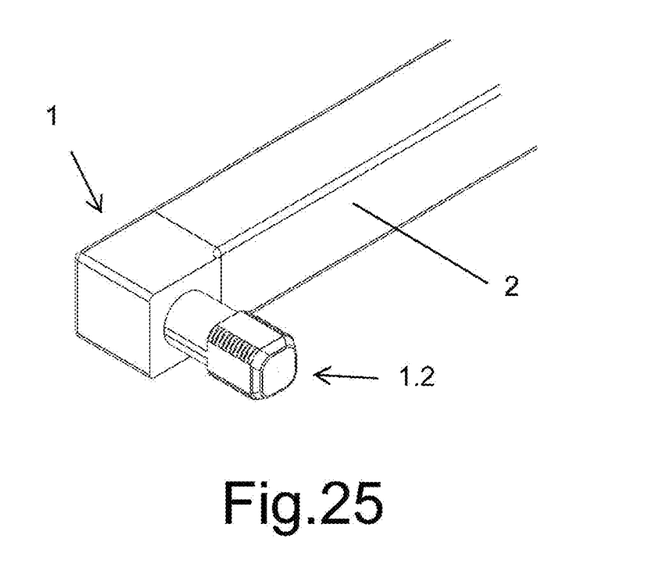

With regard to the tubular profiles (2), they are preferably formed by extrusion in a metal material such as aluminium, but without being considered in a limiting sense. As shown in FIG. 19, each tubular profile (2) has a quadrangular cross section with a square or rectangular edge and it determines therein an internal substantially square shape (2.1) having four walls identified with the reference number (2.2). Thus, taking advantage of the fact that the distance (d1) in the internal diagonals of this internal shape (2.1) is greater than the distance (d2) between two opposite walls (2.2), see FIG. 21, this allows the corresponding arm (1.2) of a node (1) to be inserted so that its external sections with the screw threads (1.2.2) enter through the ends of the diagonals of the internal shape (2.1) of the tubular profile (2), and with a simple turn of no more than 45°, these external threaded sections (1.2.2) engage inside the faces of the walls (2.2) of the internal shape (2.1), thereby firmly fastening the node (1) to the corresponding tubular profile (2), without needing to use any tool and with a simple and quick turn of no more than 45°. To ensure that the faces of the node (1) are aligned with the external faces of the tubular profile (2), it is envisaged that the internal shape (2.1) is rotated 45° with respect to the external faces.

Furthermore, it has been envisaged that said internal square shape (2.1) of the tubular profiles (2) has, in one of the walls (2.2), at least one opening (2.3) to set a final fastening point between each node (1) and its corresponding tubular profile (2). In addition, this opening (2.3) also allows other functions to be fulfilled, such as the passage of electrical cables, when the tubular profile incorporates its own lighting means.

FIGS. 22 to 25 show how each node (1) is fastened to its corresponding tubular profile (2), by simply rotating them relative to one another by no more than 45° and without needing to use any tool.

Figure 20:
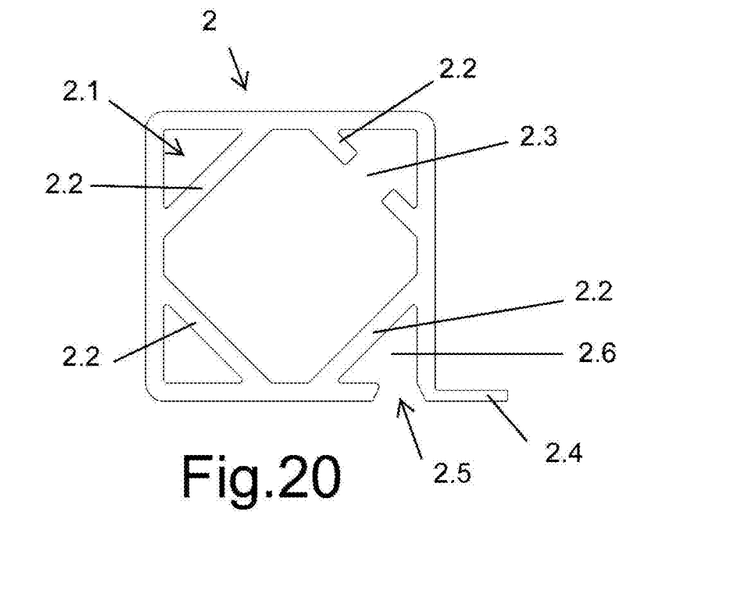
FIG. 20 is like FIG. 19, but now with a tubular profile (2) intended to occupy a horizontal position and support a plate made of glass or other material not shown, whereby it has a flange (2.4), as well as an opening (2.5) along one of its corners behind which a space (2.6) is defined.

As shown in FIG. 20, some of the tubular profiles (2) that will occupy a horizontal arrangement in the final assembly may have a flange (2.4) along the same, in order to be able to support a wooden, glass or plastic plate on this flange (2.4), which fulfils the shelving functions and even allows this flange (2.4) to fulfil stop functions, when each node (1) and its corresponding tubular profile (2) rotate relative to one another.

Figure 26:
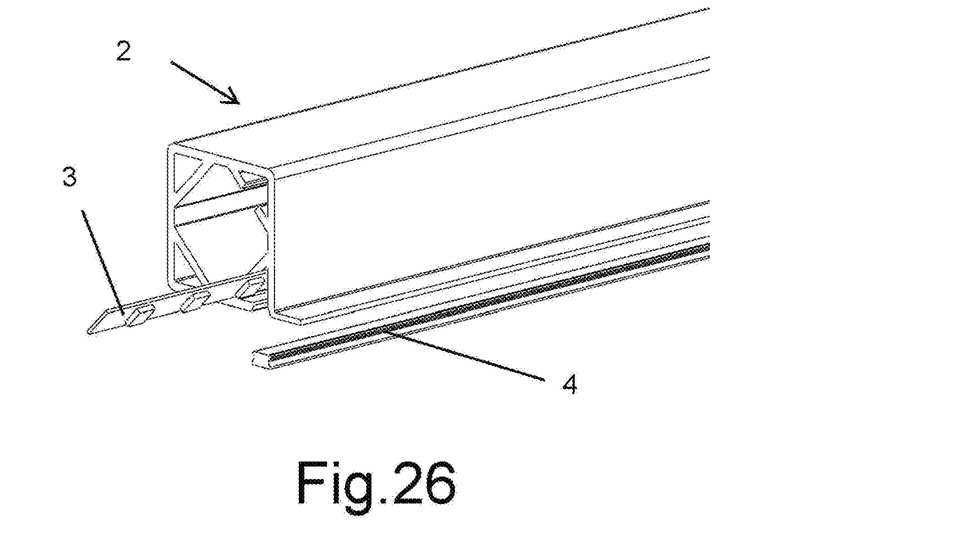
FIGS. 26 and 27 are two perspective details that show the assembly of an LED light strip (3) and a weatherstrip (4) on a tubular profile (2).
Figure 27:
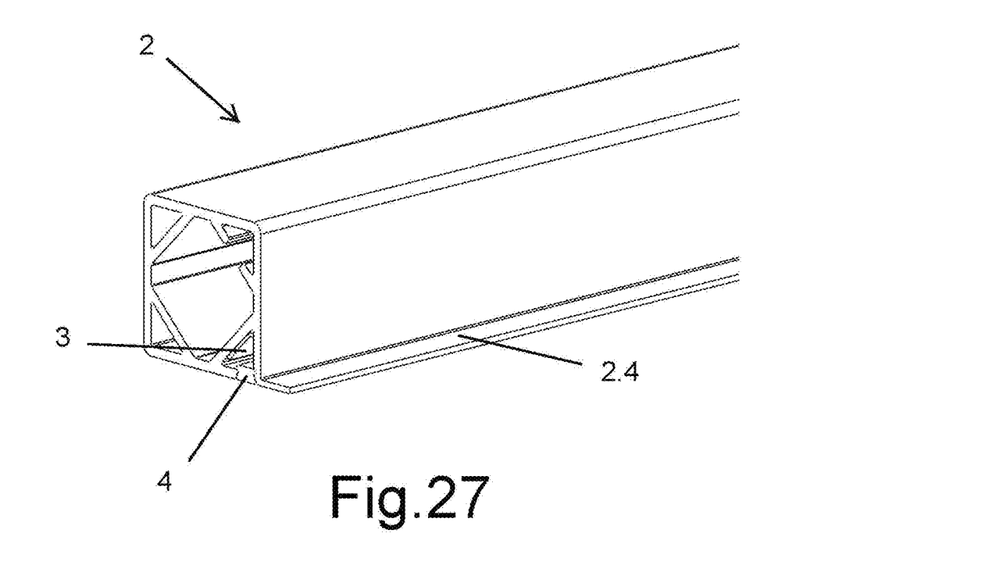

Furthermore, FIG. 20 also shows how at least one of the corners of the tubular profile (2) may have an opening (2.5) for assembling a decorative weatherstrip by means of elastic clipping, said weatherstrip identified with the reference (4) in FIGS. 26 and 27.

If this weatherstrip (4) is only decorative, it can be opaque and have different colours. If the structure has its own lighting means, it has been envisaged that these lighting means will be behind the weatherstrip (4) and in this case they will be translucent or transparent.

FIGS. 26 and 27 show how the aforementioned lighting means consisting of one or more LED light strips (3) are assembled. As shown, the LED strip or strips are inserted into the space (2.6) defined behind the opening (2.5) and subsequently the weatherstrip (4) is assembled in this opening (2.5).

Logically, a tubular profile (2) may not have the opening (2.5) if it does not have its own lighting and/or decorative weatherstrip (4), or it may have one or more openings (2.5) if it has more than one weatherstrip (4).

With the described embodiment of the tubular profiles (2), manufactured by extrusion, said profiles can be manufactured in long strips that will be cut according to the needs of each case, since, regardless of the length of the tubular profile (2) that is to be cut, said profile will always have the internal square shape (2.1) at its ends for fastening the nodes (1).

It should also be noted that, for simplicity of representation, the tubular profile (2) has a quadrangular external edge, but this is not limiting since it could be circumferential or even mixtilinear, as long as the internal square shape (2.1) defined by the four walls (2.2) is maintained.

As a variant of a practical embodiment, it has been envisaged that the core (1.1) of each node (1) adopts non-prismatic shapes and also, for aesthetic reasons, it has a false lid that covers the same on its visible faces such that all the cores (1.1) have the same finish and the lids are what provide the necessary finish of colour, coating bath, etc. in each case.

It should be noted that this solution provides great flexibility, since it allows this system to be adapted to various dimensions/external designs of the tubular profiles (2) and to also be complemented, for example, with rails for sliding doors or hanging accessories that are incorporated into the housing space (2.6) of the LED light strips (3), taking advantage of this space (2.6) and the opening (2.5) of the tubular profile (2).

Due to the existence of the internal square shape (2.1), the screw thread (1.2.2) of each arm (1.2) acts against the walls (2.2) of the internal square shape (2.1) and not against the external walls of the tubular profile (2), thus preventing unwanted deformations of these external walls from occurring. Furthermore, and with this solution, the walls (2.2) can have the most suitable width dimension to facilitate the engagement of the screw threads (1.2.2) and can even have different width dimensions along the same or finishes that facilitate this fastening.

It is also worth noting that the fact that the screw threads (1.2.2) are determined along the bevels parallel to the longitudinal axis of the tubular profile (2) establishes that when each node (1) and its respective tubular profile (2) rotate relative to one another in order to fasten both parts, it is the crests of all the screw threads (1.2.2) that affect the inside of the faces of the walls (2.2) of the internal square shape (2.1), thereby engaging all the screw threads (1.2.2) and not engaging along only one screw thread (1.2.2), thus resulting in a much more robust and effective fastening.

The invention claimed is:

1. A structure for use in constructing shelves and items of furniture, the structure comprising:
   a plurality of tubular profiles, each tubular profile comprising a body comprising (1) a first external shape that includes four external surfaces forming a first square shape and (2) four internal walls defining an internal cavity having a second square shape, wherein the second square shape is rotated forty-five (45) degrees relative to the first square shape;
   a plurality of nodes, each node having at least two arms, each arm adapted to be fastened inside an end of a respective tubular profile,
   wherein each arm includes a part having a second external shape corresponding to the second square shape of the internal cavity, the second external shape of the part comprising four sides and four beveled corners, the four sides including a first pair of opposite and parallel sides and a second pair of opposite and parallel sides, each beveled corner having a bevel that extends along a length of the part and is parallel to a longitudinal axis of the respective arm, each bevel comprising screw threads,
   wherein the part is adapted to be inserted into a corresponding cavity of a corresponding tubular profile and rotated relative to the corresponding tubular profile, causing the screw threads of the plurality of corners of the part to engage with the corresponding tubular profile, thereby fastening the part, the arm and a corresponding node to the corresponding tubular profile.

2. The structure for use in constructing shelves and items of furniture, according to claim 1, wherein each arm further comprises an element adapted to fit into a housing of a core of a second corresponding node, the housing having toothing adapted to engage with the element of the arm and fasten the arm in the core.

3. The structure for use in constructing shelves and items of furniture, according to claim 1, wherein at least one tubular profile occupies a horizontal position in assembled position in the structure and has a flange in at least one corner that extends along the at least one tubular profile, the flange being adapted to perform a stop function when the at least one tubular profile rotates relative to a second corresponding node, the flange being further adapted to support a plate.

4. The structure for use in constructing shelves and items of furniture, according to claim 1, wherein at least one of the four internal walls of each respective tubular profile has an opening that is adapted to provide a fastening point between the respective tubular profile and a second corresponding node and is further adapted to allow passage of electrical cables.

5. The structure for use in constructing shelves and items of furniture, according to claim 1, wherein each respective tubular profile includes an opening in at least one corner that extends along the tubular profile to allow assembly of a weatherstrip.

6. The structure for use in constructing shelves and items of furniture, according to claim 5, wherein a housing is defined behind the opening and extends along the tubular profile, allowing insertion of one or more LED light strips.

7. The structure for use in constructing shelves and items of furniture, according to claim 1, wherein at least one of the plurality of tubular profiles or the plurality of nodes comprises steel.

* * * * *